(12) United States Patent
Venkata et al.

(10) Patent No.: US 7,521,505 B2
(45) Date of Patent: Apr. 21, 2009

(54) METHOD OF STABILIZATION OF DIHYDRIC PHENOLS

(75) Inventors: Venugopal Boddapaty Venkata, Bangalore (IN); Gurram Kishan, Bangalore (IN); Jan Pleun Lens, Breda (NL); Daniel Francis Lowery, Schenectady, NY (US); Mahesh Malusare, Bangalore (IN); Patrick Joseph McCloskey, Watervliet, NY (US); Manisha Potdar, Bangalore (IN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 442 days.

(21) Appl. No.: 11/423,531

(22) Filed: Jun. 12, 2006

(65) Prior Publication Data
US 2007/0287797 A1    Dec. 13, 2007

(51) Int. Cl.
C08G 64/20    (2006.01)
C08K 5/092    (2006.01)
C08L 69/00    (2006.01)

(52) U.S. Cl. .................. 524/773; 524/321; 528/198
(58) Field of Classification Search .............. None
See application file for complete search history.

(56) References Cited

U.S. PATENT DOCUMENTS

| | | | |
|---|---|---|---|
| 3,277,029 A * | 10/1966 | Chadwick et al. ............. 521/97 |
| 3,592,858 A | 7/1971 | Brimer | |
| 3,855,150 A | 12/1974 | Weris, III | |
| 4,308,110 A | 12/1981 | Hosaka et al. | |
| 4,308,406 A | 12/1981 | Takenaka et al. | |
| 4,894,486 A | 1/1990 | Neil, Jr. | |
| 5,382,708 A | 1/1995 | Kissinger | |
| 5,405,933 A | 4/1995 | Sakashita et al. | |
| 5,418,315 A | 5/1995 | Sakashita et al. | |
| 6,313,259 B1 | 11/2001 | Miyamoto et al. | |
| 6,866,909 B2 | 3/2005 | Wisnudel et al. | |
| 6,906,122 B1 | 6/2005 | Zobel et al. | |
| 6,863,897 B2 | 8/2005 | Love et al. | |
| 7,034,099 B2 | 4/2006 | Kamps et al. | |
| 2002/0173566 A1 | 11/2002 | Haese et al. | |
| 2005/0261460 A1 | 11/2005 | Cella et al. | |

FOREIGN PATENT DOCUMENTS

EP    736558    * 10/1996
GB    1464072    2/1977

OTHER PUBLICATIONS

PCT International Search Report for International Application No. PCT/US2007/066842.

ASTM E313-05, Standard Practice for Calculating Yellowness and Whiteness Indices from Instrumentally Measured Color Coordinates.
Vitamin E: A New Primary Antioxidant; S. Laermer, S. Young, T. Young, P. Zambetti; Hoffman-LaRoche, Inc. Industrial & Agricultural Products, Nutley, NJ, USA (1996). Supplied by The British Library. pp. 503-526.
Thermal Decomposition of Some Phenolic Antioxidants; Anwar A. Hamama, Wassef W. Nawar. J. Agric. Food Chem. 1991, 39, 1063-1069.
Studies on the Antioxidants XVIII: Oxidation Product of Tertiary Butyl Hydroquinone (TBHQ) (I). T. Kureichi, M. Aizawa, A. Kunugi, Jaocs, vol. 60, No. 11 (Nov. 1983.). pp. 1878-1882.
Degradation Products of 2-tert-Butylhydroquinone at Frying Temperature. C.M. Kim, D.E. Pratt. vol. 55, No. 3, 1990—Journal of Food Science. pp. 847-853.
Vitamin C Derivatives as Antioxidant Agents. website http://ww.netsci-journal.com/97v4/97014/vitc5.html. pp. 1-7.
Antioxidants. website: http://class.fst.ohio-state.edu/fst605/lectures/lect6.html. pp. 1-8.
Enzymatic Assay of Catechol Oxidase (EC 1.14.18.1). website: http//:sigmaaldrich.com/img/assets/18160/ Catechol Oxidase. SPCATE01.001; Feb. 9, 1993. pp. 1-3.
WAU dissertation No. 1126. The In Vitro Biotransformation of Hexachlorobenzene in Relation to its Toxicity. Ben Van Ommen. Mar. 6, 1987. website: http://library.wur.nl/wda/abstract/ab1126.html. pp. 1-3.
PCT Search Report for International Patent Application No. PCT/US2007/066845.

* cited by examiner

Primary Examiner—David Buttner

(57) ABSTRACT

A method of producing a polycarbonate, the method comprising:

polymerizing a dihydric phenol and a carbonate precursor in the presence of oxalic acid to produce a polycarbonate with a yellowness index of less than or equal to 10 measured in accordance with ASTM E313 test method on molded samples having a thickness of about 2.5 millimeters;

wherein the amount of oxalic acid ranges from about 20 parts per million to about 350 parts per million, relative to an amount of the dihydric phenol; wherein the dihydric phenol is represented by Formula (I):

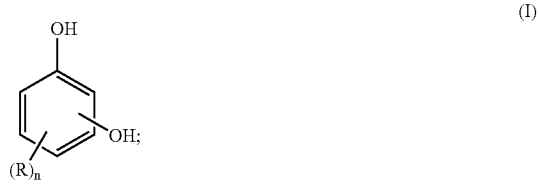

wherein R is a hydrogen atom or an aliphatic functionality having 1 to 6 carbon atoms; and n is an integer having a value of 1 to 4.

16 Claims, No Drawings

METHOD OF STABILIZATION OF DIHYDRIC PHENOLS

BACKGROUND

This disclosure generally relates to the stabilization of dihydric phenols. More particularly the disclosure relates to stabilizing the dihydric phenols, under the conditions prevailing in a polymerization reaction.

Polycarbonates are ranked among the most important of the world's engineering thermoplastics. Bisphenol A polycarbonate is currently the most widely used polycarbonate and its world wide annual production exceeds one billion pounds. Polycarbonates are used in hundreds of applications such as eyeglass lenses and optical media, where their transparency and tough physical properties are beneficial. Some dihydric phenols, for example methyl hydroquinone, are key monomers for preparing polycarbonates that are used in specialty applications, such as, for example, in packaging for cosmetic, perfume, or biochemical applications. In addition to being chemically resistant and transparent, the polycarbonates also need to have improved color (i.e., reduced yellowness index).

However, some dihydric phenols, such as, for example, hydroquinone and methyl hydroquinone, acquire color under oxygen, heat or storage, either due to oxidation and/or due to thermally activated processes. This discoloration is more intense in the presence of iron and/or other transition or non-transition metals, which are known to form colored metal complexes with the dihydric phenols. This discoloration may cause quality issues in the production of the dihydric phenols and in the production of polycarbonates made using these dihydric phenols. The discoloration also lowers the commercial value of the dihydric phenols and the polycarbonates made therefrom.

In order to prevent or minimize the discoloration of dihydric phenols, it is known to mix the dihydric phenol with a suitable stabilizer. However, the effective quantity and the compatibility of the stabilizer depends very much on the process conditions used for making the dihydric phenols and the corresponding polycarbonates, the level of trace metals already present in the dihydric phenols and whether the dihydric phenol is exposed to metal parts or containers during storage or during the preparation of the polycarbonates. Further, the stabilizers known in the art are low boilers or decompose at high temperatures and release corrosive chemicals causing discoloration of dihydric phenols either in contact with air or metal. It is not economically feasible in the process to have completely metal-free dihydric phenols. It is also not economically viable to use an all glass assembly to avoid contact with metal during storage or during the polymerization reactions.

Hence there is a need for suitable stabilizers that will prevent or minimize the discoloration of dihydric phenols, especially under the high temperature conditions in which the polymerization reactions are conducted.

BRIEF SUMMARY

Disclosed herein is a method for the stabilization of dihydric phenols in a polymerization reaction to provide a polycarbonate with a yellowness index (YI) of less than or equal to 10. The method helps to prevent or reduce the discoloration of the dihydric phenols in the presence of air and/or under high temperature conditions, for example, at temperatures that are required for a polymerization reaction.

In one embodiment, a method of producing a polycarbonate comprises polymerizing a dihydric phenol and a carbonate precursor in the presence of oxalic acid to provide a polycarbonate with a yellowness index of less than or equal to 10 measured in accordance with ASTM E313 test method on molded samples having a thickness of about 2.5 millimeters; wherein the oxalic acid is present in an amount of about 20 parts per million (ppm) to about 350 ppm; wherein the dihydric phenol is represented by Formula (I):

(I)

wherein R is a hydrogen atom or an aliphatic functionality having 1 to 6 carbon atoms; and "n" is an integer having a value of 1 to 4.

The disclosure may be understood more readily by reference to the following detailed description and the examples included therein.

DETAILED DESCRIPTION

Disclosed herein is a process for preventing or minimizing discoloration of polycarbonates. Also disclosed are methods for the stabilization of the dihydric phenols used for preparing the polycarbonates. The polycarbonates prepared herein using the stabilized dihydric phenols, such as for example, methyl hydroquinone, can be used in speciality applications, such as in packaging for cosmetic, perfume and biochemical applications.

The singular forms "a" "an" and "the" include plural referents unless the context clearly dictates otherwise. All ranges disclosed herein are inclusive of the recited endpoint and independently combinable (for example ranges of "from about 2 grams to about 10 grams" is inclusive of the endpoints and all the intermediate values of the ranges of 2 grams to about 10 grams).

The modifier "about" used in connection with a quantity is inclusive of the stated value and has the meaning dictated by the context (for example, includes the degree of error associated with the measurement of the particular quantity).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "cycloaliphatic functionality" designates cyclic aliphatic functionalities having a valence of at least one and comprising an array of atoms which is cyclic but which is not aromatic. A "cycloaliphatic functionality" may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). The cycloaliphatic functionality may include heteroatoms such as nitrogen, sulfur, selenium, silicon and oxygen, or may be composed exclusively of carbon and hydrogen. For convenience, the term "cycloaliphatic functionality" is defined herein to encompass a wide range of functional groups such as alkyl groups, alkenyl groups, alkynyl groups, haloalkyl groups, conjugated dienyl groups, alcohol groups, ether groups, carboxylic acid groups, acyl groups (for example carboxylic acid derivatives such as esters and amides), amine groups and nitro groups. For example, the 4-methylcyclopent-1-yl group is a $C_6$ cycloaliphatic functionality comprising a methyl group, wherein the methyl group is a functional group which is an alkyl group. Similarly, the 2-nitrocyclobut-1-yl group is a $C_4$ cycloaliphatic functionality comprising a nitro group, wherein the nitro group is a functional group. A cycloaliphatic functionality may comprise one or more halogen atoms which may be the same or different. Exemplary cycloaliphatic functionalities comprise cyclopropyl, cyclobutyl, 1,1,4,4-tetramethylcyclobutyl, piperidinyl, 2,2,6,6-tetramethylpiperydinyl, cyclohexyl and cyclopentyl.

As used herein, the term "aromatic functionality" refers to an array of atoms having a valence of at least one comprising at least one aromatic group. The array of atoms having a valence of at least one, comprising at least one aromatic group, may include heteroatoms such as nitrogen, sulfur, selenium, silicon and oxygen, or may be composed exclusively of carbon and hydrogen. As used herein, the term "aromatic functionality" includes but is not limited to, phenyl, pyridyl, furanyl, thienyl, naphthyl, phenylene, and biphenyl functionalities. The aromatic functionality may also include nonaromatic components. For example, a benzyl group is an aromatic functionality that comprises a phenyl ring (the aromatic group) and a methylene group (the nonaromatic component). Similarly a tetrahydronaphthyl functionality is an aromatic functionality comprising an aromatic group ($C_6H_3$) fused to a nonaromatic component ($CH_2$)$_4$. For convenience, the term "aromatic functionality" is defined herein to encompass a wide range of functional groups such as alkyl groups, haloalkyl groups, haloaromatic groups, alcohol groups, ether groups, carboxylic acid groups, acyl groups (for example carboxylic acid derivatives such as esters and amides), amine groups and nitro groups. For example, the 4-methylphenyl functionality is a $C_7$ aromatic functionality comprising a methyl group, wherein the methyl group is a functional group, which is an alkyl group. Similarly, the 2-nitrophenyl group is a $C_6$ aromatic functionality comprising a nitro group, wherein the nitro group is a functional group. Aromatic functionalities include halogenated aromatic functionalities. Exemplary aromatic functionalities include, but are not limited to, phenyl, 4-trifluoromethylphenyl, 4-chloromethylphen-1-yl, 3-trichloromethylphen-1-yl (3-$CCl_3$Ph-), 4-(3-bromoprop-1-yl)phen-1-yl (4-$BrCH_2CH_2CH_2$Ph-), 4-aminophen-1-yl (4-$H_2$NPh-), 4-hydroxymethylphen-1-yl (4-$HOCH_2$Ph-), 4-methylthiophen-1-yl (4-$CH_3$SPh-), 3-methoxyphen-1-yl and 2-nitromethylphen-1-yl (2-$NO_2CH_2$Ph), and naphthyl.

As used herein the term "aliphatic functionality" refers to a linear or branched array of atoms that is not cyclic and has a valence of at least one. Aliphatic functionalities are defined to comprise at least one carbon atom. The array of atoms may include heteroatoms such as nitrogen, sulfur, silicon, selenium and oxygen or may be composed exclusively of carbon and hydrogen. For convenience, the term "aliphatic functionality" is defined herein to encompass, as part of the "linear or branched array of atoms which is not cyclic" a wide range of functional groups such as alkyl groups, haloalkyl groups, alcohol groups, ether groups, carboxylic acid groups, acyl groups (for example carboxylic acid derivatives such as esters and amides), amine groups and nitro groups. For example, the 4-methylpent-1-yl is a $C_6$ aliphatic functionality comprising a methyl group, wherein the methyl group is a functional group, which is an alkyl group. Similarly, the 4-nitrobut-1-yl group is a $C_4$ aliphatic functionality comprising a nitro group, wherein the nitro group is a functional group. An aliphatic functionality may be a haloalkyl group which comprises one or more halogen atoms which may be the same or different. Exemplary aliphatic functionalities include, but are not limited to, methyl, ethyl, propyl, isopropyl, butyl, isobutyl, pentyl, isopentyl, trifluoromethyl, bromodifluoromethyl, chlorodifluoromethyl, chloromethyl, trichloromethyl, bromoethyl, 2-hexyl, hexamethylene, hydroxymethyl (i.e., $CH_2OH$), mercaptomethyl ($CH_2SH$), methylthio ($SCH_3$), methylthiomethyl ($CH_2SCH_3$), methoxy, methoxycarbonyl ($CH_3OCO$), nitromethyl ($CH_2NO_2$) and thiocarbonyl.

In one embodiment, a method of producing of a polycarbonate comprises polymerizing a dihydric phenol and a carbonate precursor in the presence of oxalic acid to provide a polycarbonate with a yellowness index of less than or equal to 10 measured in accordance with ASTM E313 test method on molded samples having a thickness of about 2.5 millimeters, wherein the oxalic acid is present in an amount of about 20 ppm to about 350 ppm based on the amount of the dihydric phenol.

The dihydric phenols that can be stabilized using the above process are represented by Formula (I):

wherein R is a hydrogen atom or an aliphatic functionality having 1 to 6 carbon atoms and "n" is an integer having a value of 1 to 4. Specific non-limiting examples of the dihydric phenol of Formula (I) include hydroquinone, resorcinol, catechol, 2-methyl hydroquinone, 2,5-dimethyl hydroquinone, 2-ethyl hydroquinone, 2,5-diethyl hydroquinone, 2-tertiary-butyl hydroquinone, 2,3,5-trimethyl hydroquinone, 2-isopropyl hydroquinone, 2,5-diisopropyl hydroquinone, and mixtures of two or more of the foregoing dihydric phenols.

In another embodiment, a method of producing a polycarbonate comprises polymerizing a dihydric phenol and a carbonate precursor in the presence of a catalyst and oxalic acid to provide a polycarbonate with a yellowness index of less than or equal to 10 measured in accordance with ASTM E313 test method on molded samples having a thickness of about 2.5 millimeters; wherein the dihydric phenol is represented by Formula (II):

wherein R is a hydrogen atom or a methyl group.

In yet another embodiment, a method of producing a polycarbonate comprises polymerizing a dihydric phenol and an activated carbonate in the presence of a catalyst and oxalic acid to provide a polycarbonate with a yellowness index of less than or equal to 10 measured in accordance with ASTM E313 test method on molded samples having a thickness of about 2.5 millimeters; and wherein the dihydric phenol is represented by Formula (II).

The amount of oxalic acid used is about 20 ppm to about 350 ppm, based on the amount of the dihydric phenol. Within this range the amount may be greater than or equal to 50 ppm, or more specifically, greater than or equal to about 75 ppm, based on the amount of the dihydric phenol. Also within this range the amount may be less than or equal to about 300 ppm, or more specifically less than or equal to about 250 ppm, based on the amount of the dihydric phenol.

In one embodiment, the step of polymerizing the dihydric phenol in the presence of oxalic acid comprises adding oxalic acid to the polymerization reaction mixture comprising the dihydric phenol, a carbonate precursor and a catalyst.

In another embodiment, the step of polymerizing the dihydric phenol in the presence of oxalic acid comprises mixing the dihydric phenol with oxalic acid to obtain a stabilized dihydric phenol. The stabilized dihydric phenol is then reacted with a carbonate precursor to obtain the polycarbonate.

The oxalic acid can be mixed with the dihydric phenol used in the polymerization reaction in a variety of ways as known to a person skilled in the art. Typically, a predetermined amount of oxalic acid is added to the dihydric phenol, and the resulting mixture is heated to a temperature higher than the melting point of the dihydric phenol under an inert gas atmosphere, for example, nitrogen gas, or under reduced pressure, for a period of time sufficient to obtain a uniform mixture. The melt is then allowed to cool. Alternately, the mixing of oxalic acid with the dihydric phenol may be carried out in an aqueous medium. If required, the mixture of oxalic acid and the dihydric phenol in the aqueous medium may be heated to a temperature where the dihydric phenol and oxalic acid dissolve in the aqueous medium. Oxalic acid may be added in a solid powder form, in the form of an aqueous solution or in the form of a solution in a solvent that dissolves oxalic acid. In one embodiment, a predetermined amount of oxalic acid is added to the polymerization mixture comprising the dihydric phenol having Formula (I) before starting the polymerization reaction.

In one embodiment, the temperature at which the mixing of oxalic acid with the dihydric phenol can be carried out ranges from about 25° C. to about 120° C. Within this range the temperature may be greater than or equal to about 40° C., or more specifically, greater than or equal to about 50° C. Also within this range the temperature may be less than or equal to about 110° C., or more specifically, less than or equal to about 80° C. The time taken for the mixing of oxalic acid can be about 0.5 hour to about 5 hours. Within this range the time may be greater than or equal to about 2 hours, or more specifically, greater than or equal to about 2.5 hours. Also within this range the time may be less than or equal to about 4 hours, or more specifically, less than or equal to about 3 hours.

In various embodiments, the polycarbonate can be prepared by using the interfacial polymerization method or by using the melt polymerization method. The reaction of the dihydric phenol with a carbonate precursor, such as, for example, phosgene, in the presence of water, an organic solvent, an acid acceptor and a catalyst is typical of the interfacial method. The reaction of the dihydric phenol with a carbonate precursor, such as, for example, diphenyl carbonate, in the presence of a catalyst and the absence of solvent is typical of the melt polymerization method. In one embodiment, the polycarbonate is prepared by using the melt polymerization method. The melt polymerization method can also be referred to as the melt transesterification method, transesterification method or simply as the melt method.

Suitable carbonate precursors that can be used in the polymerization reaction comprise a carbonyl halide, a haloformate, a carbonate ester or an activated carbonate. Specific non-limiting examples of carbonyl halides include carbonyl chloride (phosgene) and carbonyl bromide. Specific non-limiting examples of haloformates include bishaloformates of dihydric phenols, such as, for example, bischloroformates of hydroquinone, and bishaloformates of glycols, such as for example, bischloroformates of ethylene glycol, neopentyl glycol, and polyethylene glycol. Specific non-limiting examples of the carbonate esters include diphenyl carbonate, ditolyl carbonate, bis(chlorophenyl) carbonate, meta cresyl carbonate, dinaphthyl carbonate, bis(diphenyl)carbonate, diethyl carbonate, dimethyl carbonate, dibutyl carbonate, dicyclohexyl carbonate and a combination comprising two or more of the foregoing carbonate esters.

As used herein, the term "activated carbonate" also at times referred to as activated diaryl carbonate, is defined as a diaryl carbonate that is more reactive than diphenyl carbonate in transesterification reactions. In one embodiment, the activated carbonate typically has a Formula (III):

(III)

wherein Ar is a substituted aromatic functionality having 6 to 30 carbon atoms. In one embodiment, the activated carbonates have the more specific Formula (IV):

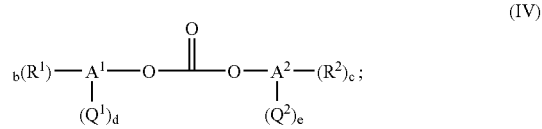

(IV)

wherein $Q^1$ and $Q^2$ are each independently an activating group present on $A^1$ and $A^2$ respectively, positioned ortho to the carbonate linkage. $A^1$ and $A^2$ are each independently aromatic rings which can be the same or different depending on the number and location of their substituent groups; "d" and "e" have a value of 0 to a maximum equivalent to the number of replaceable hydrogen groups substituted on the aromatic rings $A^1$ and A2 respectively, wherein "d+e" is greater than or equal to 1. $R^1$ and $R^2$ are each independently an aliphatic functionality, a cycloaliphatic functionality, an aromatic functionality, cyano, nitro or a halogen. The number "b" has a value of 0 to a maximum equivalent to the number of replaceable hydrogen atoms on the aromatic ring $A^1$ minus the number "d" and the number "c" has a value of 0 to a maximum equivalent to the number of replaceable hydrogen atoms on the aromatic ring $A^2$ minus the number "e". The number, type and location of the $R^1$ or $R^2$ substituents on the aromatic ring is not limited unless they deactivate the carbonate and lead to a carbonate which is less reactive than diphenyl carbonate.

Suitable non-limiting examples of suitable activating groups $Q^1$ and $Q^2$ include (alkoxycarbonyl)aryl groups, halogens, nitro groups, amide groups, sulfone groups, sulfoxide groups, or imine groups with structures shown below:

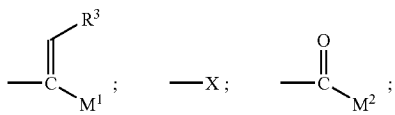

wherein X is halogen or nitro; $M^1$ and $M^2$ independently comprise N-dialkyl, N-alkylaryl, an aliphatic functionality or an aromatic functionality; and $R^3$ is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on $A^1$ and $A^2$ are different can also be used as the carbonate precursor. In one embodiment, the activated carbonate is an ester-substituted diaryl carbonate having the Formula (V):

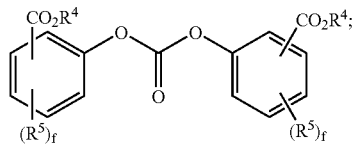

wherein $R^4$ is independently at each occurrence an aliphatic functionality having 1 to 20 carbons, a cycloaliphatic functionality having 4 to 20 carbons, or an aromatic functionality having 4 to 20 carbons, $R^5$ is independently at each occurrence a halogen atom, cyano group, nitro group, an aliphatic functionality having 1 to 20 carbons, a cycloaliphatic functionality having 4 to 20 carbons, or an aromatic functionality having 4 to 20 carbons and "f" is independently at each occurrence an integer having a value of 0 to 4. In one embodiment, at least one of the substituents $CO_2R^4$ is attached in an ortho position of Formula (V).

Examples of specific ester-substituted diaryl carbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

The polycarbonates prepared herein can either be homopolymers or co-polymers. The co-polymers can be prepared in the presence of oxalic acid by using the dihydric phenols of Formula (I) in combination with dihydroxy compounds having Formula (VI):

wherein $R^6$ includes a functionality of Formula (VII):

and wherein $Y^1$ is independently selected from the group consisting of an aliphatic functionality having 1 to 50 carbon atoms, a halogen, an oxy group and a nitro group, and $A^1$ and $A^2$ are as defined above. In another embodiment, the dihydroxy compound includes bisphenol compounds of general Formula (VIII):

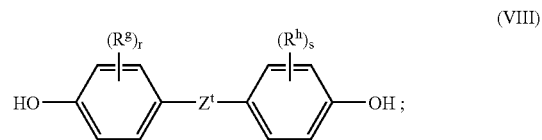

wherein $R^g$ and $R^h$ each independently represent a halogen atom or an aliphatic functionality having 1 to 10 carbon atoms and may be the same or different; "r" and "s" are each independently integers having a value of 0 to 4; and $Z^t$ represents one of the groups of Formula (IX):

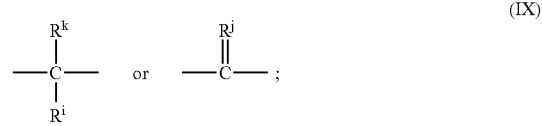

wherein $R^k$ and $R^i$ each independently represent a hydrogen atom or an aliphatic functionality having 1 to 10 carbon atoms or a cycloaliphatic functionality having 3 to 10 carbon atoms and $R^j$ is a divalent aliphatic functionality having 1 to 10 carbon atoms.

Some non-limiting examples of suitable dihydroxy compounds of Formula (VI) that may be used in combination with the dihydric phenol of Formula (I) include, but are not limited to, 1,1-bis-(4-hydroxy-3-methylphenyl)cyclohexane, 2-phenyl-3,3-bis(4-hydroxyphenyl)phthalimidine, eugenol siloxane bisphenol, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, as well as combinations comprising at least one of the foregoing dihydroxy compounds.

Specific examples of dihydroxy compounds may include, but are not limited to, 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl) propane. Combinations comprising at least one of the foregoing dihydroxy compounds may also be used. In one embodiment, the bisphenol compound used is bisphenol A.

The polycarbonates prepared by following the process described herein typically comprise about 1 to about 100 mole percent of the dihydric phenol having Formula (I) and about 0 to 99 mole percent of the dihydroxy compound having Formula (VI). In one embodiment, both the dihydric phenol and the dihydroxy compound are present in an amount of about 50 mole percent each. In another embodiment, the polycarbonate comprises two or more dihydric phenols, such as, for example methyl hydroquinone and hydroquinone, and a dihydroxy compound, in equimolar quantities.

Catalysts known for use in melt transesterification processes may be used in reactions involving activated carbonates. Known melt catalysts include, for example, salts of alkaline earth metals, salts of alkali metals, quaternary ammonium compounds, quaternary phosphonium compounds, and mixtures thereof. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that degrades at a temperature used in the reaction (i.e., a "beta" catalyst). Some non-limiting examples of alpha catalysts include sodium hydroxide, potassium hydroxide, sodium potassium hydrogen phosphate and lithium hydroxide. Some non-limiting examples of beta catalysts include tetramethylammonium hydroxide, tetrabutylammonium hydroxide, tetramethylphosphonium hydroxide, tetraphenylphosphonium hydroxide, tetraphenylphosphonium acetate, tetramethylphosphonium formate, tetrabutylphosphonium hydroxide, and tetrabutylphosphonium acetate. In one embodiment, the total amount of catalyst employed is about $1 \times 10^{-7}$ to about $1 \times 10^{-2}$ moles, more specifically about $1 \times 10^{-6}$ to about $1 \times 10^{-3}$ moles, or even more specifically about $1 \times 10^{-5}$ to about $1 \times 10^{-4}$ moles of catalyst based on the total moles of the mixture of dihydric phenol of Formula (I) and dihydroxy compound of Formula (VI) employed. In one embodiment, the alpha catalyst used is sodium hydroxide. In one embodiment, the beta catalyst used is tetrabutylphosphonium acetate or tetramethylammonium hydroxide.

The reactants for the polymerization reaction can be charged into a reactor either in the solid form or in the molten form. Initial charging of reactants into a reactor and subsequent mixing of these materials under reactive conditions for polymerization may be conducted in an inert gas atmosphere, such as a nitrogen atmosphere. The charging of one or more reactant may also be done at a later stage of the polymerization reaction. Mixing of the reaction mixture is accomplished by any of the methods known in the art, such as by stirring. Process parameters include time, temperature, pressure and other factors that affect polymerization of the reactants. In one embodiment, the activated aromatic carbonate is added in a mole ratio of about 0.8 to about 1.3, relative to the total moles of the dihydric phenol and the dihydroxy compound (if used). Within this range the molar ratio may be greater than or equal to 0.9, or more specifically, greater than or equal to about 1.0, relative to the total moles of the dihydric phenol and the dihydroxy compound. Also within this range the molar ratio may be less than or equal to about 1.2, or more specifically less than or equal to about 1.1, relative to the total moles of the dihydric phenol and the dihydroxy compound.

The melt polymerization reaction is conducted by subjecting the above reaction mixture to a series of temperature-pressure-time protocols. In some embodiments, this involves gradually raising the reaction temperature in stages while gradually lowering the pressure in stages. In one embodiment, the pressure is reduced from about atmospheric pressure at the start of the reaction to about 0.01 millibar (1 Pa) or in another embodiment, to 0.05 millibar (5 Pa) in several steps as the reaction approaches completion. The temperature may be varied in a stepwise fashion beginning at a temperature of about the melting temperature of the reaction mixture and subsequently increasing to about 320° C. In one embodiment, the reaction mixture is heated from room temperature to about 150° C. The polymerization reaction starts at a temperature of about 150° C. to about 220° C., then is increased to about 220° C. to about 250° C. and is then further increased to a temperature of about 250° C. to about 320° C. It is to be noted that the temperature ranges maintained ensure that the reaction mixture stays in a melt condition and the reaction proceeds in the forward direction. In one embodiment, the total reaction time is about 30 minutes to about 200 minutes. This procedure will generally ensure that the reactants react to give polycarbonates with the desired molecular weight, glass transition temperature and physical properties. The reaction proceeds to build the polycarbonate chain with the production of an ester-substituted alcohol by-product, such as methyl salicylate. Efficient removal of the by-product may be achieved by different techniques, such as reducing the pressure. Generally the pressure is relatively high in the beginning of the reaction and is lowered progressively throughout the reaction while the temperature is raised throughout the reaction. However, experimentation is needed to find the most efficient conditions for particular production equipment.

The progress of the reaction may be monitored by measuring the melt viscosity or the weight average molecular weight of the reaction mixture using techniques known in the art, such as gel permeation chromatography. These properties may be measured by taking discreet samples or may be measured on-line at specific time intervals. After the desired melt viscosity and/or molecular weight is reached, the final polycarbonate product may be isolated from the reactor in a solid or molten form. The method of making the polycarbonate as described herein may be in a batch or a continuous process, and the process disclosed herein is essentially carried out in a solvent free mode. Reactors chosen should ideally be self-cleaning and should minimize any hot spots. The vented extruders that are commercially available may be used.

In one embodiment, the polycarbonate may be prepared in an extruder in the presence of one or more catalysts and a carbonate precursor wherein the carbonate precursor is an activated carbonate. The reactants for the polymerization reaction can be fed to the extruder in powder or molten form. In one embodiment, the reactants are dry blended prior to being added in to the extruder. As disclosed herein, the reactants typically comprise dihydric phenol, carbonate precursor, dihydroxy compound, and oxalic acid. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants. Many different screw designs and extruder configurations are commercially available that use single screws, double screws, vents, back flight and forward flight zones, seals, sidestreams and sizes. One skilled in the art may have to experiment to find the best designs using generally known principals of commercial extruder design.

As previously discussed, the polycarbonates prepared in the presence of oxalic acid show a substantially less discoloration compared to the polycarbonates prepared in the absence of oxalic acid. Without being bound by theory it is believed that the discoloration of the dihydric phenols can be attributed to the formation of the corresponding benzoquinone compounds and other benzoquinone like compounds. The dihydric phenols form the corresponding benzoquinone and benzoquinone like compounds in the presence of air and/or high temperature conditions as well as in the presence of trace amounts of metals, like iron (Fe), present in the dihydric phenols. Benzoquinone and benzoquinone like compounds are colored. The benzoquinone like compounds include oligomers of benzoquinone like compounds, and these compounds are also colored. These benzoquinone and benzoquinone like compounds may result in the corresponding polymer having a YI of greater than 10. However the presence of oxalic acid prevents or reduces the formation of the colored compounds thereby retaining the APHA (American Public Health Association) value of the dihydric phenol at less than or equal to 40. Without being bound by theory, it is believed that the oxalic acid form chelates or complexes with the trace metals, thereby retarding the formation of the corresponding benzoquinone and benzoquinone like compounds.

The polycarbonates prepared in the presence of specific amounts of oxalic acid show required molecular weight build up, increased transparency, and improved color compared to polycarbonates prepared in the absence of oxalic acid. The color improvement in the stabilized dihydric phenol can be measured in terms of APHA values or absorptivity values. The color improvement in the polycarbonate prepared using the stabilized dihydric phenols can be measured in terms of YI or dYI. The YI value of the corresponding polycarbonate is less then 10. The dYI value of the corresponding polycarbonate is less than 1.

The polycarbonates prepared using the process described herein can be used in various polymer compositions. The compositions may further optionally include various additives ordinarily incorporated in resin compositions of this type. Such additives may include antioxidants, heat stabilizers, flame retardants, UV stabilizers, anti-static agents (tetraalkylammonium benzene sulfonate salts, tetraalkylphosphonium benzene sulfonate salts, and the like), mold releasing agents (pentaerythritol tetrastearate, glycerol monostearate, and the like), and the like, and combinations comprising the foregoing. For example, the polymer composition can comprise a heat stabilizer from about 0.01 weight percent to about 0.1 weight percent; an antistatic agent from about 0.01 weight percent to about 1 weight percent; and/or a mold releasing agent from about 0.1 weight percent to about 1 weight percent, each based upon the total weight of the polymer.

The polymer compositions may be used for any application in which the physical and chemical properties of the material are desired. In certain embodiments the polymers may be used in applications including packaging material (and especially drug and cosmetic packaging), automotive parts, telecommunication accessories (for example, cell phone covers), computers and consumer electronics, construction materials, medical devices, eyewear products, secure documents including passports and identity cards, credit cards, films and sheets (including those used in display applications), and the like.

A further understanding of the techniques described above can be obtained by reference to certain specific examples that are provided herein for purposes of illustration only and are not intended to be limiting.

EXAMPLES

The following examples illustrate the advantage of adding specific amounts of oxalic acid as a stabilizer to dihydric phenols by demonstrating an improvement in the YI or dYI values of the polycarbonate prepared using the stabilized monomer.

Methyl hydroquinone (MeHQ) and Hydroquinone (HQ) used in the Examples were obtained from commercial sources, such as, for example, from Hunan, in China and from Shirdi Chemicals, in India. The samples were about 99 percent pure when analyzed using High Performance Liquid Chromatography (HPLC) using a Shimadzu 2010 HPLC instrument, based on weight percent. The starting sample of MeHQ and HQ is hereinafter referred to as raw MeHQ and raw HQ respectively.

The molecular weight (MW) of the co-polymer was determined by Gel Permeation Chromatography (GPC) technique. A Shimadzu system connected with a UV-detector (254 nm) was used for this purpose. A sample of the co-polymer was dissolved in chloroform and injected into a PLgel 5 micrometer column at 35° C. and the molecular weight was measured using polystyrene standards in methylene chloride solvent.

The YI values were measured as follows. About 2 g of dried co-polymer samples were compression molded into a round discs with a diameter of 3.5 centimeter at a temperature of 180° C. The percentage transmittance of these discs was then measured using a GretagMacbeth Color Eye 7000 spectrophotometer over a range of 400 nm to 700 nm. The spectrophotometer provided a percentage Transmittance (% T) values which was then converted to absorbance values (A) using the correlation A=2-log % T. Since absorbance has a linear function with thickness (Beer-Lambert law) the samples were corrected for (small) differences in thickness (measured with a micrometer). The % T data for all samples was converted to transmittance data for 2.5 millimeter thick samples. The corrected % T data was then used for calculating the color information (L*a*b*) values using the procedure described in ISO standard 7724. The procedure described in ISO standard 7724 provided the CIE tristimulus values. These tristimulus values were then used to calculate YI in accordance with ASTM E313 test method.

The dYI of the reaction mixtures obtained in the Examples was measured as follows. A 10 g sample of the reaction mixture was withdrawn from the reactor tube, cooled to room temperature and added to 100 ml of chloroform to obtain a 10 weight percent (weight by volume) solution. The dYI value obtained for the reaction mixture is equal to the YI of a solution of the reaction mixture in chloroform minus the YI of chloroform.

The raw MeHQ or raw HQ available from commercial sources typically have about 400 to 500 ppm of oxalic acid present. The raw MeHQ and raw HQ are subjected to a purification process to reduce the amount of oxalic acid present before being used in the polymerization reaction. As indicated in the results in Table 1 below, if raw MeHQ or raw HQ is directly used for the polymerization reaction, the polycarbonate formed has a lower molecular weight and higher YI or dYI value than polycarbonates formed from purified MeHQ and HQ. The purified MeHQ or HQ used in the Examples was obtained by following the method described below.

The raw MeHQ was purified using the following process. To a one-liter round bottom flask equipped with a condenser and a nitrogen blanket were charged raw MeHQ (50 grams (g)), acetone (38 milliliters (ml)) and toluene (200 ml). The flask was then heated in an oil bath at 90° C. for about 30 to 45 minutes. After complete dissolution of the raw MeHQ in the flask, silica gel (60-120 mesh; 5 g) was added, and the resultant mixture was stirred at about 200 rotations per minute for about 2 hours at a temperature of 90° C. The mixture was then filtered, and the filtrate was concentrated at 70° C. under a reduced pressure of 300 millibars to obtain a concentrate. The pressure was reduced to 175 millibars in a period of about 3 hours resulting in the precipitation of MeHQ from the concentrate. The concentrate containing the precipitated MeHQ was then maintained at 5° C. for about 24 hours, filtered and then washed with 100 ml of toluene to obtain purified MeHQ. The raw HQ can be purified in the same manner. The purified MeHQ or HQ was found to contain an undetectable amount of oxalic acid, as measured by an HPLC technique described below.

The analysis of oxalic acid content in the purified MeHQ was carried out using a Shimadzu 2010 High performance liquid chromatography (HPLC) instrument. The column used was a Shodex SUGAR SH-G SH1011 (8×300 mm) column. The instrument was at first calibrated to estimate the retention time of oxalic acid. Then a 20 microliters sample solution, prepared using 300 mg MeHQ in 10 ml acetonitrile, was injected into the column. The mobile phase used to elute the sample in the column was a 0.01 normal sulfuric acid solution in water, with a flow rate of 1.0 ml/minute. A wavelength of 204 nm was used for the detection. The column was maintained at a temperature of 50° C. Area under the peak was measured for the peak obtained at the corresponding retention time of oxalic acid. An amount of less than 10 ppm of oxalic acid in MeHQ could not detected by the HPLC instrument. As used herein the term "control sample" means a purified dihydric phenol sample (for example, MeHQ) that does not contain any additionally added oxalic acid stabilizer. The HPLC instrument cannot detect an amount of less than 10 ppm of oxalic acid. Therefore the purified samples and control samples may have a residual level of oxalic acid of less than 10 ppm. To carry out Examples provided in Table 1, an additional amount of oxalic acid was added to the MeHQ and as shown in Table 1. In the tables below where the control sample is directly used in the examples, the term "No stabilizer (control sample)" is used to indicate that no additional oxalic acid is added in the Example.

Examples 1 to 5 and Comparative Examples 1 and 2

CE-1 and CE-2

Polycarbonate co-polymers were prepared as follows. Bisphenol A (3.36 g) and MeHQ (1.83 g), tetramethylammonium hydroxide (TMAH) (268 microgram), BMSC (10 g) and oxalic acid (amount as provided in Table 1; added as a solution in 50 microliters of water), were charged into a round bottom flask. The contents of the flask were then stirred to form a mixture. The mixture was then purged with nitrogen. The mixture was then heated to about 160° C. and maintained at this temperature for about 3 hours. The heating was then stopped and the dYI of the resultant reaction mixture measured.

Examples 6 to 12 and Comparative Examples 3 and 4

CE-3 and CE-4

Polycarbonate terpolymers were prepared as follows. Bisphenol A (3.99 g), HQ (1.87 g) and MeHQ (2.11 g), tetrabutylphosphonium acetate (TBPA; 0.001956 g), diphenyl carbonate (11.02 g) and oxalic acid (amount as provided in Table 1; added as a solution in 50 microliters of water), were charged into a round bottom flask to form a mixture. The mixture was then purged with nitrogen. The mixture was then heated to about 170° C. and maintained at this temperature for about 3 hours. The heating was then stopped and the dYI/YI of the resultant reaction mixture measured. In the examples where the YI was measured, the polymerization reaction was taken to completion, the polycarbonate isolated and the molecular weight and the YI of the polycarbonate was measured.

Examples 13 to 15

Polycarbonate terpolymers were prepared as follows. Bisphenol A (19.62 g) and HQ (4.05 g) and MeHQ (2.11 g), tetrabutylphosphonium acetate (TBPA; 0.001956 g), diphenyl carbonate (26.3 g) and oxalic acid (amount as provided in Table 1; added as a solution in 50 microliter water), were charged into a round bottom flask. The contents of the flask were then stirred to form a mixture. The mixture was then purged with nitrogen. The mixture was then heated to about 160° C. and maintained at this temperature for about 3 hours. The heating was then stopped and the dYI/YI of the resultant reaction mixture measured.

The YI/dYI values for the Examples and comparative Examples discussed above are included in Table 1 below. The term "NT" stands for "not-tested".

TABLE 1

| Example No. | Monomer | Co-polymer/Terpolymer | Oxalic acid in ppm | MWPS | dYI | YI |
|---|---|---|---|---|---|---|
| 1 | MeHQ | MeHQ/BPA | 46 | NT | 0.835 | NT |
| 2 | MeHQ | MeHQ/BPA | 52 | NT | 0.831 | NT |
| 3 | MeHQ | MeHQ/BPA | 80 | NT | 0.451 | NT |
| 4 | MeHQ | MeHQ/BPA | 100 | NT | 0.566 | NT |
| 5 | MeHQ | MeHQ/BPA | 163 | NT | 0.863 | NT |
| 6 | MeHQ | MeHQ/HQ/BPA | 134 | 71000 | 0.3 | NT |
| 7 | MeHQ | MeHQ/HQ/BPA | 65 | 58000 | 0.253 | NT |
| 8 | MeHQ | MeHQ/HQ/BPA | 20 | 53000 | NT | NT |
| 10 | MeHQ | MeHQ/HQ/BPA | 40 | 56000 | NT | NT |
| 11 | MeHQ | MeHQ/HQ/BPA | 80 | 57000 | NT | NT |
| 12 | MeHQ | MeHQ/HQ/BPA | 124 | 57000 | NT | 9.7 |
| 13 | HQ | HQ/BPA | 211 | 50000 | 0.106 | NT |
| 14 | HQ | HQ/BPA | 189 | 52000 | NT | 5 |
| 15 | HQ | HQ/BPA | 213 | 57000 | NT | 7 |
| CE-1 | MeHQ | MeHQ/BPA | No stabilizer-(control sample) | NT | 1.615 | NT |
| CE-2 | MeHQ | MeHQ/BPA | 410 | 39000 | 4.44 | NT |
| CE-3 | MeHQ | MeHQ/HQ/BPA | Greater than 400 | 40000 | NT | 14.7 |
| CE-4 | MeHQ | MeHQ/HQ/BPA | No stabilizer (control sample) | 46000 | NT | 15 |
| CE-5 | MeHQ | MeHQ/BPA | 500 | <10000 | NT | NT |

Examples 1 to 5 indicate that when the polymerization is carried out in the presence of 46 ppm to 163 ppm of oxalic acid, the dYI of the polycarbonate is substantially less than a sample with no stabilizer or a sample with more than 400 ppm of stabilizer. When between 20 and 350 ppm of oxalic acid is used, the molecular weight build up, YI and/or dYI is much better than when no stabilizer or more than 400 ppm of oxalic acid stabilizer is used.

Examples 16 to 21 and Comparative Example 6

CE-6

Polycarbonate polymerization was carried out by varying the amount of polymerization catalyst while keeping the oxalic acid level constant at 27 ppm. Bisphenol A (19.62 g) and purified HQ (4.05 g), TBPA (amounts as included in Table 2), diphenyl carbonate (26.3 g) and oxalic acid were charged into a round bottom flask. The contents of the flask were then stirred to form a mixture. The mixture was then purged with nitrogen. The mixture was then heated to about 160° C. and maintained at this temperature for about 3 hours. The heating was then stopped and the dYI of the resultant reaction mixture measured.

TABLE 2

| Example | TBPA in g | dYI |
|---|---|---|
| 16 | 0.000978 | 0.53 |
| 17 | 0.001956 | 0.33 |
| 18 | 0.00293 | 0.3 |
| 19 | 0.00391 | 0.29 |
| 20 | 0.00586 | 0.41 |
| 21 | 0.00782 | 0.81 |
| CE-6 | 0.00978 | 1.1 |

Examples 16 to 20 indicate that when the polymerization is carried out in the presence of 0.000978 g to 0.00586 g of TBPA while keeping the amount of oxalic acid constant at 27 ppm, there is a decrease in the dYI value of the polycarbonate from 0.53 to 0.41. However, in Example 21, as the amount of catalyst is increased to 0.00782 g the dYI value increased to 0.81 and in Comparative Example 6, wherein the amount of catalyst is increased to 0.00978 g the dYI value increased to 1.1. This indicates that some amount of experimentation is required to determine the amount of catalyst used in order to obtain a lower dYI value. The amount of catalyst is dependent on the total amount dihydric phenol and dihydroxy compound that is used in the polymerization reaction.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A method of producing a polycarbonate, the method comprising:
    polymerizing a dihydric phenol and a carbonate precursor in the presence of oxalic acid to provide a polycarbonate with a yellowness index of less than or equal to 10 measured in accordance with ASTM E313 test method on molded samples having a thickness of about 2.5 millimeters;
    wherein the amount of oxalic acid ranges from about 20 parts per million to about 350 parts per million, relative to an amount of the dihydric phenol; wherein the dihydric phenol is represented by Formula (I):

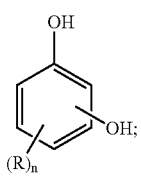

(I)

wherein R is a hydrogen atom or an aliphatic functionality having 1 to 6 carbon atoms; and n is an integer having a value of 1 to 4.

2. The method of claim 1, wherein the oxalic acid is present in an amount of about 50 parts per million to about 300 parts per million, relative to an amount of the dihydric phenol.

3. The method of claim 1, wherein the step of polymerizing the dihydric phenol in the presence of oxalic acid comprises:
    mixing the dihydric phenol with oxalic acid to obtain a stabilized dihydric phenol;

and polymerizing the stabilized dihydric phenol in the presence of a carbonate precursor and a catalyst.

4. The method of claim 3, wherein the mixing is effected at a temperature higher than the melting point of the dihydric phenol.

5. The method of claim 3, wherein the mixing is effected under atmospheric pressure or under a reduced pressure.

6. The method of claim 1, wherein the step of polymerizing comprises a melt polymerization method or an interfacial polymerization method.

7. The method of claim 1, wherein the carbonate precursor comprises a carbonyl halide, a haloformate, a carbonate ester or an activated carbonate.

8. The method of claim 1, wherein the carbonate precursor comprises diphenyl carbonate or bis(methylsalicyl)carbonate.

9. The method of claim 3, wherein the catalyst comprises:
   a. an alpha catalyst selected from the group consisting of alkali metal salts and alkaline earth metal salt; and
   b. a beta catalyst selected from the group consisting of a quaternary ammonium compound and a quaternary phosphonium compound.

10. A polycarbonate produced by the method of claim 1.

11. The method of claim 1, wherein the dihydric phenol comprises methyl hydroquinone.

12. A method of producing a polycarbonate, the method comprising:
   polymerizing a dihydric phenol and a carbonate precursor in the presence of a catalyst and oxalic acid to provide a polycarbonate with a yellowness index of less than or equal to 10 measured in accordance with ASTM E313 test method on molded samples having a thickness of about 2.5 millimeters;
   wherein the amount of oxalic acid ranges from about 20 parts per million to about 350 parts per million, relative to an amount of the dihydric phenol; wherein the dihydric phenol is represented by Formula (II):

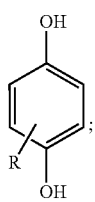

(II)

wherein R is a hydrogen atom or a methyl group.

13. The method of claim 12, wherein the catalyst comprises:
   a. an alpha catalyst selected from the group consisting of alkali metal salts and alkaline earth metal salt; and
   b. a beta catalyst selected from the group consisting of a quaternary ammonium compound and a quaternary phosphonium compound.

14. A method of producing a polycarbonate, the method comprising:
   polymerizing a dihydric phenol and an activated carbonate in the presence of a catalyst and oxalic acid to provide a polycarbonate with a yellowness index of less than or equal to 10 measured in accordance with ASTM E313 test method on molded samples having a thickness of about 2.5 millimeters;
   wherein the amount of oxalic acid ranges from about 20 parts per million to about 350 parts per million, relative to an amount of the dihydric phenol; wherein the dihydric phenol is represented by Formula (II):

wherein R is a hydrogen atom or a methyl group.

15. The method of claim 14, wherein the carbonate precursor comprises diphenyl carbonate or bis(methylsalicyl)carbonate.

16. The method of claim 14, wherein the catalyst comprises:
   a. an alpha catalyst selected from the group consisting of alkali metal salts and alkaline earth metal salt; and
   b. a beta catalyst selected from the group consisting of a quaternary ammonium compound and a quaternary phosphonium compound.

* * * * *